US010091357B1

(12) United States Patent
Stern et al.

(10) Patent No.: US 10,091,357 B1
(45) Date of Patent: Oct. 2, 2018

(54) SYSTEM AND METHOD FOR AUTOMATED PERFORMANCE MONITORING

(71) Applicant: NICE LTD., Ra'anana (IL)

(72) Inventors: Jeffrey Stern, Tel Aviv (IL); Yoav Shichel, Tzoran (IL); Natan Katz, Tel Aviv (IL)

(73) Assignee: NICE LTD., Ra'nana (IL)

( * ) Notice: Subject to any disclaimer, the term of this patent is extended or adjusted under 35 U.S.C. 154(b) by 0 days.

(21) Appl. No.: 15/452,752

(22) Filed: Mar. 8, 2017

(51) Int. Cl.
*H04M 3/00* (2006.01)
*H04M 3/51* (2006.01)

(52) U.S. Cl.
CPC .... *H04M 3/5175* (2013.01); *H04M 2203/401* (2013.01); *H04M 2203/403* (2013.01); *H04M 2203/558* (2013.01)

(58) Field of Classification Search
CPC .. H04M 3/5175; H04M 3/523; H04M 3/5183; H04M 3/5191; H04M 3/5233; H04M 3/5235; H04M 3/5232
USPC .......................... 379/265.01–265.02, 265.06, 379/265.12–265.13
See application file for complete search history.

(56) References Cited

U.S. PATENT DOCUMENTS 8,699,691 B2 * 4/2014 Kohler ................ H04M 3/5175 379/265.02
2003/0048893 A1 * 3/2003 McIllwaine ...... G06Q 10/06398 379/265.06

* cited by examiner

*Primary Examiner* — Rasha Al Aubaidi
(74) *Attorney, Agent, or Firm* — Pearl Cohen Zedek Latzer Baratz LLP (57) ABSTRACT

A method and system for evaluating the performance of individuals, such as agents in a call center, each performing multiple tasks may include obtaining a performance score for each execution of a task by individuals in the group of individuals; determining the distribution of the performance scores; comparing single performance scores with the distribution of performance scores; and selecting a single performance score for an individual based on said comparison. An oscillator algorithm may be used to determine whether said selected performance score is part of a trend in performance by that individual.

17 Claims, 7 Drawing Sheets

SYSTEM AND METHOD FOR AUTOMATED PERFORMANCE MONITORING

FIELD OF THE INVENTION

The present invention is in the field of performance analysis, such as automated monitoring of the performance of individuals in carrying out or executing certain tasks. Some embodiments of the invention are useful in monitoring the performance of individuals responding to calls or other interactions, for example agents working in contact or call centers. The invention is equally applicable to the execution of other kinds of task by other kinds of individual, and is not limited to human individuals.

BACKGROUND OF THE INVENTION

The purpose of monitoring the performance of individuals executing tasks, such as evaluating calls and coaching agents (e.g. people performing customer service tasks), is to improve the quality of the task, e.g. an interaction, and train the individuals towards improved performance Agent evaluations may be based on hard coded rules which are generic to an agent's type. Based on such rules, certain kinds of interaction may be evaluated over a standard time period with a standard amount of interaction of a standard type. Due to the generic nature of such processes they may perform poorly in terms of improving agent performance. The same applies to the monitoring of performance of individuals in general.

SUMMARY OF THE INVENTION

Some embodiments of the invention provide systems and methods of evaluating the performance of an individual in a group of individuals each executing multiple tasks. According to some embodiments of the invention an oscillator algorithm may be used to automatically identify whether a performance score achieved by an individual is indicative of a trend. In a method according to some embodiments of the invention an individual may be selected for performance trend detection based on a comparison of a single performance score by that individual with a distribution of performance scores for multiple individuals in the group, for example to identify one or more outliers. Here it should be noted that the term "outlier" is intended to have its ordinary meaning and may therefore simply indicate one that is outstanding in some way, for example one whose performance is above or below a threshold. Some embodiments of the invention provide a computer readable medium comprising instructions which, when implemented in or executed by a processor in a computer or computing system, cause the processor to execute a method according to the invention.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Some embodiments of the invention may enable evaluation of an individual's performance to be carried out in an automated manner. For example, a downward trend in performance may be identified and a cause for this trend may also be identified. A great wealth of data relating to interactions is captured in call centers and this enables performance to be measured against a wide range of indicators and a large number of possible causes for poor or diminishing performance to be investigated.

An interaction as used herein may be any communication, for example, between a caller (e.g. a person requiring service or having an inquiry) and one or more agents, over a communication network. The routing of a call may be controlled by a call exchange such as such as a Private Branch Exchange "PBX" and may also be referred to as a "communication session". Interactions may include but are not limited to voice telephone calls, e.g. voice over internet protocol "VoIP", and video calls. It should be noted also that an interaction may be a one-way interaction where there is a one-way "conversation" or flow of real-time transport protocol "RTP" packets from a user endpoint to the recorder, or may be a two-way (bi-directional) or multi-path interaction between two or more parties where there is a multi-path "conversation" or flow of RTP packets from each of the multiple user endpoints to the recorder.

Embodiments may be implemented in a computer system, for example and depending on the amount of data to be analyzed a desktop personal computer or bank of computers, one of which is described with reference to FIG. 7. A standard computer system may be used in which a processor or processors are configured, for example by being suitably programmed, to perform a method according to some embodiments of the invention.

Some embodiments of the invention may enable the identification of a trending problem, as opposed for example to an isolated problem, of an individual such as an agent in a call center executing a task such as interacting with a caller or other third party. The trending may be identified for example for a specific performance indicator and possibly also for a particular type of interaction. A notification of the trending problem may be output, for example for the benefit of the individual's manager. This may indicate the nature of the problem, for example one or more key performance indicators "KPIs" against which performance was measured to determine the trend, the probable cause of the downward trend and the scale of the problem. For example, in order to determine the scale of a trending problem, sample statistics such as mean and standard deviation may be determined and a specific measurement relating to an individual may be assessed with respect to these statistics. The output notification may identify some representative interactions that demonstrate the problem and the probable cause. Furthermore, the identification of trending may be used to initiate training of the individual, for example by directing the individual to an automated, e.g. machine based, training program. All of this may be done automatically, e.g. without human intervention.

For the purpose of explanation only, operations performed according to some embodiments of the invention may be generally grouped into or by selection of individuals, e.g. of agents in a call center; trend detection and cause evaluation.

Selection of Individuals

Figure 1:
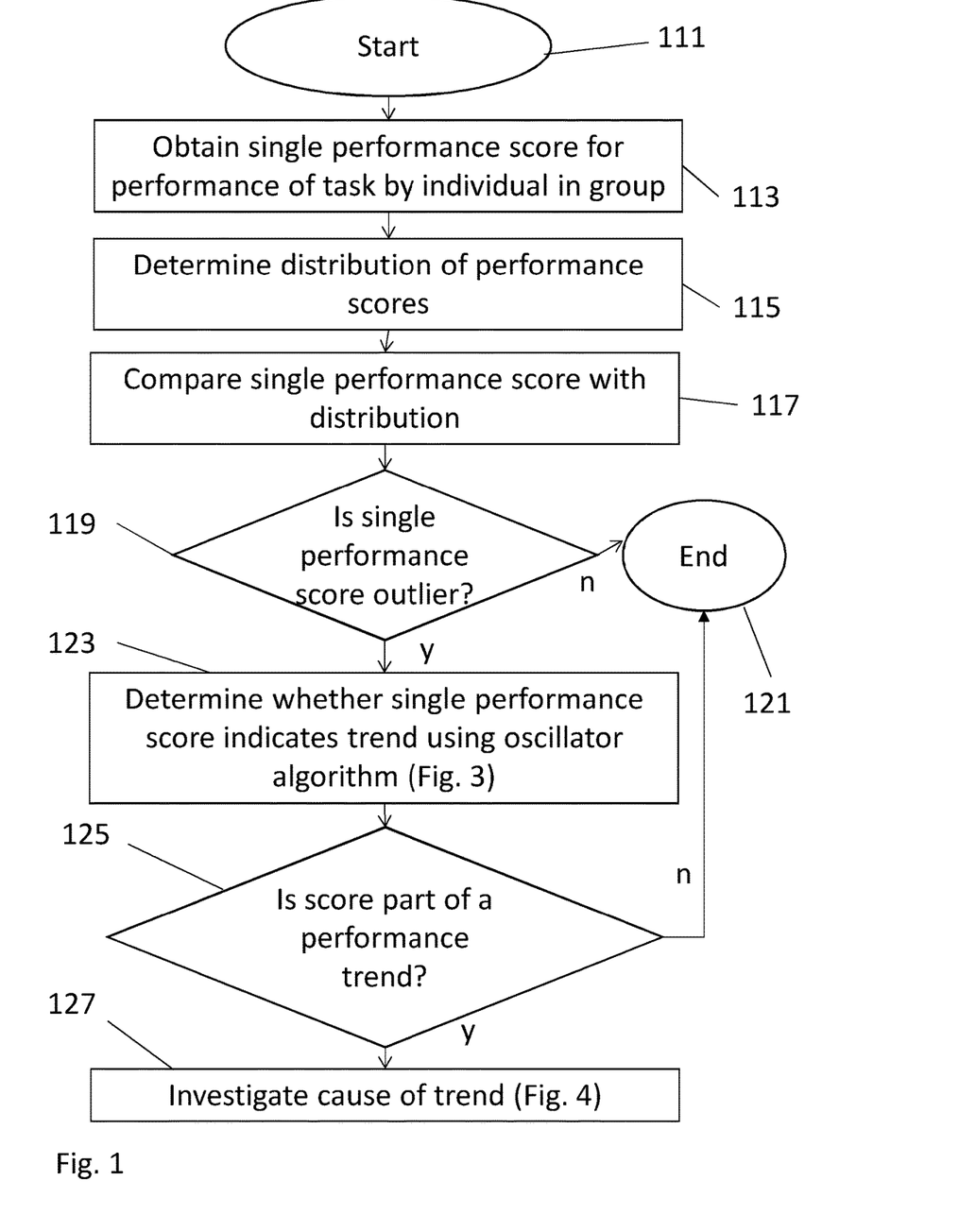
FIG. 1 is a flow chart showing a series of operations that may be performed in a method of performance evaluation according to some embodiments of the invention.

FIG. 1 is a flow chart showing a series of operations that may be performed in a method of performance evaluation according to some embodiments of the invention. The flow of FIG. 1 begins with start up at operation 111, followed by receiving or obtaining a single performance score for an execution or performance of a task by an individual in a group at operation 113. The group may be defined in any way including but not limited to all agents working in a call center or a selection of agents from a larger group such as a graduating class of agents, or a group selected by tenure, location, specific skill set and any other selection method.

The performance score obtained at operation 113 may be based on a particular performance indicator. The performance score may relate to a particular kind of task, defined by one or more variables. A variable may be a category appropriate to the task or some other item of metadata describing the task. For example, in call handling, calls may be in different categories such as but not limited to complaints and invoice payments.

Some embodiments of the invention may include the determination of the performance score, for example based on one or more criteria and data relating to the execution of the task. Alternatively the performance score may have been determined elsewhere and therefore some embodiments of the invention may include receiving performance scores that have already been determined.

Different performance indicators may be appropriate for different kinds of tasks. For example, if the task is to handle an interaction with a third party, e.g. customer, a performance indicator may be handling time, which may be measured in various ways. If the interaction is a voice call a performance indicator may be the duration of the call. Any other performance indicator may be determined at operation 113 including but not limited to customer satisfaction, occurrences of certain words or phrases such as "I don't understand" during an interaction, duration of silent periods and others known to those skilled in the art. According to some embodiments of the invention, a performance indicator determined or obtained at operation 113 may be a simple or weighted sum of performance indicators.

The performance indicator and one or more variables describing tasks may be input to a system according to embodiments of the invention, for example by an operator (e.g., a person entering data), prior to the commencement of operation 113. For example, an operator may decide on the variables that are relevant for certain performance indicators to be investigated, or on the performance indicators that are relevant for certain variables such as kinds of task.

At operation 115 a distribution of performance scores may be determined for individuals in the group. Operation 115 may be performed prior to operation 113 or in response to operation 113. The distribution may be a statistical distribution as is known in the art which indicates the range of performance scores and their frequency. The group may be for example all agents working in a contact center or a subset of all agents. For this purpose, the range of performance scores may be divided into bands or frequency bins, again as is known in the art. Operation 115 may be performed in order to determine whether the performance score obtained at operation 113 is typical or is an outlier. An outlier may be identified in various ways including but not limited to comparison with one or more thresholds. In the embodiments of the invention described with reference to FIG. 1, the performance scores whose distribution determined at operation 115 may be all according to the same indicator or indicators, for the purpose of comparing different individuals and determining a distribution of performance scores. The performance scores forming the distribution at operation 115 may be scores for a particular kind of task, e.g. a task defined by one or more variables.

According to some embodiments of the invention, several distributions of performance scores may be determined at operation 115. Each distribution may be limited to a particular kind of the task, for example identified by a variable. In a contact center environment, the tasks may be interactions with third parties and the variables may include topics to which an interaction relates such as bill, customer support and product inquiries. It should be noted here that tasks may be differentiated from each other by features. In voice calls, example features may include for example sentiment, silence, cross-talk, phrases uttered, and more. It should be noted here that a variable can be a feature and a feature can be a variable. A variable is not present in all interactions and can therefore be used to divide the set of interactions into subsets. Features may be useful for example in order to investigate the cause of a trend in performance In general variables such as but not limited to product names or services or other variables mentioned herein may be used to identify types of call and features such as dissatisfaction and silence to try to understand the reason for a trend in performance.

At operation 117 the single performance score obtained at operation 113 is compared with the distribution determined at operation 115, for example in order to determine whether the individual to whom the single score belongs is to be investigated for trending, in other words whether the individual is to be selected for further evaluation. The determination may be made by any method known to those skilled in the art to identify an outlier in a set of data, and is not limited to any specific statistical technique. According to some embodiments of the invention, the comparison at operation 117 includes calculating the T-score for the single performance score. The T-score is a well-known statistical measure and may indicate how far a particular score is from the mean or average score over the whole distribution. A T-score outside a normal range might indicate an outlier.

At decision 119 the next operation is determined depending on whether the single score obtained at operation 113 was identified at operation 117 to be an outlier. If the score is not an outlier the process may end at operation 121. If the score is an outlier the agent may be selected for further performance evaluation and the flow may continue to operation 123.

At operation 123 an algorithm such as an oscillator algorithm may be used to determine whether the performance score is indicative of a trend in performance score by the individual, for example according to a series of operations described with reference to FIG. 3. This is in marked contrast to the manner in which the performance of an individual could be analyzed by a human, e.g. manager.

According to some embodiments of the invention, at operation 125 the next operation is determined depending on the outcome of operation 123. If a trend was determined at operation 123, an indication to this effect, described with reference to FIG. 3, may be output and the performance of the individual may be further investigated in any manner, for example as known in the art. According to some embodiments of the invention the performance of an individual may be investigated further, automatically, at operation 127 to find a possible cause for the trend.

If no trend was identified in operation 123, the flow may end at operation 121.

The operations of FIG. 1 may be repeated for different performance scores in order to identify or select an individual with trending performance. The performance scores received or obtained at operation 113 may be selected completely randomly or in any other way such as but not limited to every nth score for each individual. Thus the end operation 121 applies only to the performance score obtained in operation 113 and the process may recommence with another performance score.

Trend Detection

The use of an oscillator to determine whether a performance score is part of a trend will now be described in more detail. According to some embodiments of the invention, this determination is done using an oscillator algorithm, typically an algorithm executed by a processor in a computing system such as the system shown in FIG. 7.

Figure 2:
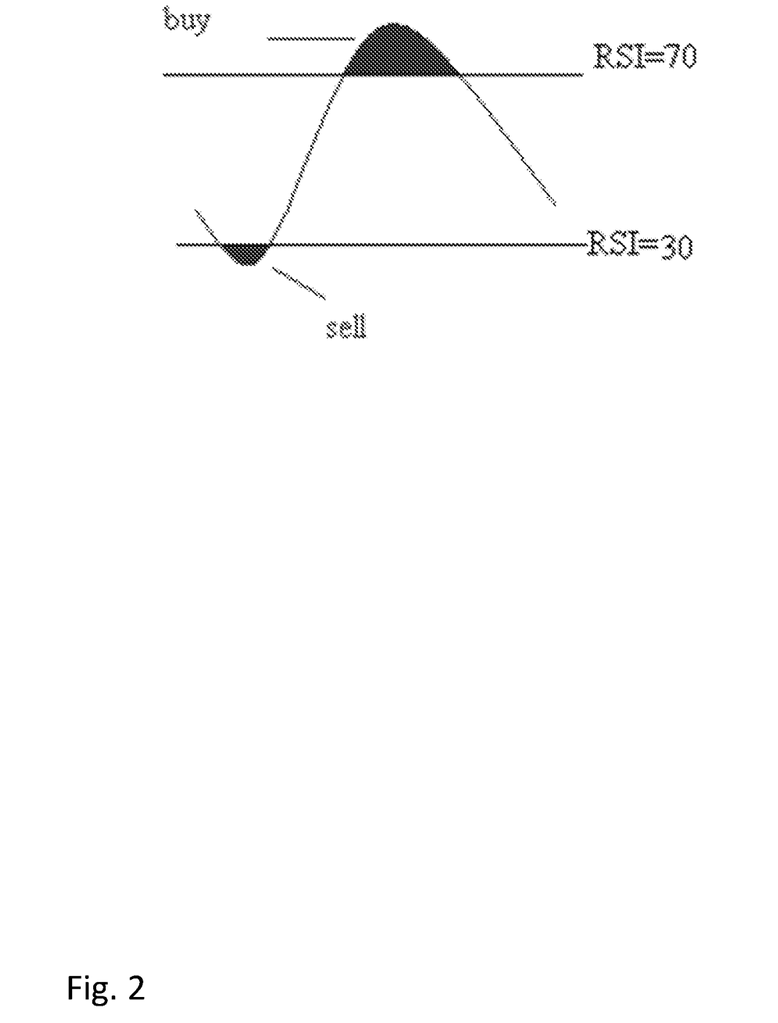
FIG. 2 shows an example pattern that may be used in an oscillator algorithm according to some embodiments of the present invention.

The use of oscillators is known in anomaly detection and in financial strategies. Oscillators are tools implemented using computers that are used to predict future behavior of stocks or indices. Typical oscillators used in this way aggregate several values of adjacent time units in order to generate a statistical sample and derive its moments. The rate in which these moments change indicates the direction in which the stock goes and hints whether a trader should take short or long positions, where "short" may be an indication to sell stock and "long" may be an indication to buy. There may be fixed threshold or mutual interactions between the oscillators that give the actual alert for taking the actions. A fixed threshold example is shown in FIG. 2.

According to some embodiments of the invention, in order to monitor performance, values of a given a KPI may be analyzed and from this relevant results may be extracted, for example individuals whose performance is trending.

Simple reliance on thresholds may not be sufficient to identify trending. Oscillators may be better tuned and thus capture interesting results more accurately since their purpose is mainly to identify candidates for further action, e.g. buy or sell. Oscillators have an advantage in that they do not necessarily rely on a certain distribution format but only on the values which determine the oscillator's values. These values can be for example score values, percentages or any other real numbers that indicate strength of performance A particular benefit of the use of oscillators is the fact that they are well proven tools to identify rapid changes, hence their widespread use in financial institutions. According to some embodiments of the invention, several types of oscillator may be made available since one oscillator or another may react better to a particular performance indicator. For example, oscillators that measure means of received data as time series and variances may be provided and selected as appropriate, with the data being performance scores according to some embodiments of the invention.

Migrating oscillator algorithms into the world of monitoring, e.g. ranking, performance of individuals performing tasks, is currently unknown. According to some embodiments of this invention, the behavior of an employee that shows poor performance may be treated in a similar manner to a market stock that provides low return. In the capital market, tools or algorithms such as moving average or relative strength index "RSI", aim to capture the peaks and troughs of the dynamics of a stock price. According to some embodiments of the present invention tools or algorithms of this kind may be used to map one side of this mechanism. For example, whereas it is known to use oscillators to capture peaks and troughs in stock dynamics, according to some embodiments of the invention only the peaks, or only the troughs, may be of interest.

It is known to use oscillators to track stock performance in two ways, either: set a threshold for both peaks and troughs and take action when an intersection takes place between the oscillator and the threshold, as illustrated in FIG. 2; or measure several oscillators simultaneously and do something when they interact.

According to some embodiments of the invention described herein, a method analogous to the former is used. Thus a threshold may be used to indicate when action should be taken. However, a multiple oscillator method may also be beneficial in monitoring performance of individuals and may be used according to some embodiments of the invention.

FIG. 2 shows an example pattern that may be used in an oscillator algorithm and shows possible dynamics of RSI. In use of the algorithm, input variables such as performance indicators may be smoothed to discern an oscillation pattern from which departures outside the bounds of the thresholds may be identified as indicative of a performance trend.

When analyzing financial products such as stocks there are well known thresholds to be applied for example in order to identify when to buy or sell stock. In the capital market a trader may see the upper solid ellipsoid in FIG. 2 as an indication that the stock's price is soon to increase hence he should buy it, whilst the lower solid shape is a sell indication. Some embodiments of the invention may use data, for example historical data, in order to establish a suitable threshold for a particular performance indicator, e.g. to be used to determine whether the performance of an individual is on a downward trend. (This is different from a threshold that might be used to identify an individual whose performance is to be investigated, such as a T-score threshold.) Some performance indicators may increase with improving performance and others may decrease depending on what is being measured. Either way, in some embodiments of the invention, only a low threshold or only a high threshold may be taken into account in order to focus on low or poor performance. It may not be necessary to use both high and low thresholds as is the case with currently used oscillator algorithms Known thresholds used in financial analysis cannot be simply applied to performance evaluation or monitoring. According to some embodiments of the invention a suitable threshold for use in an oscillator algorithm is determined, for example a performance score based on past performance scores, and possibly using machine learning. With real performance data it is possible to set and refine one or more thresholds, or use some statistical prediction tools.

When an oscillator in use to analyze financial products reaches a threshold it is expected to demonstrate a dynamic which opposes its current behavior (this is the mechanism of the stock market). Thus for example when the stock price has exceeded the upper threshold it may be assumed that it will reach a peak and then decrease, as shown in the graph of FIG. 2. In contrast, according to some embodiments of the present invention, it may be assumed that the behavior of the parameter, e.g. performance, is in a quasi-steady state, and when the oscillator reaches a low threshold it may be assumed that the performance of the individual shows bad performance and is not expected to improve. That is the point at which it may be determined that additional training or other action in relation to the individual is required. In contrast to the known use of oscillator algorithms, it is not expected that the value of the parameter will return to oscillating after crossing the threshold. Thus according to some embodiments of the invention an oscillator algorithm is used in quite a different manner from the manner in which such algorithms are currently used.

Referring to the graph of FIG. 2, according to some embodiments of the invention, by analogy to financial data, if a performance score indicates "buy" this may indicate a negative trend in performance that requires action. According to some embodiments of the invention, positive or upward trends in performance may be indicated in addition to or instead of negative or downward trends. Thus, for example if performance is in the lower solid region an individual might be eligible for a reward for good performance.

Figure 3:
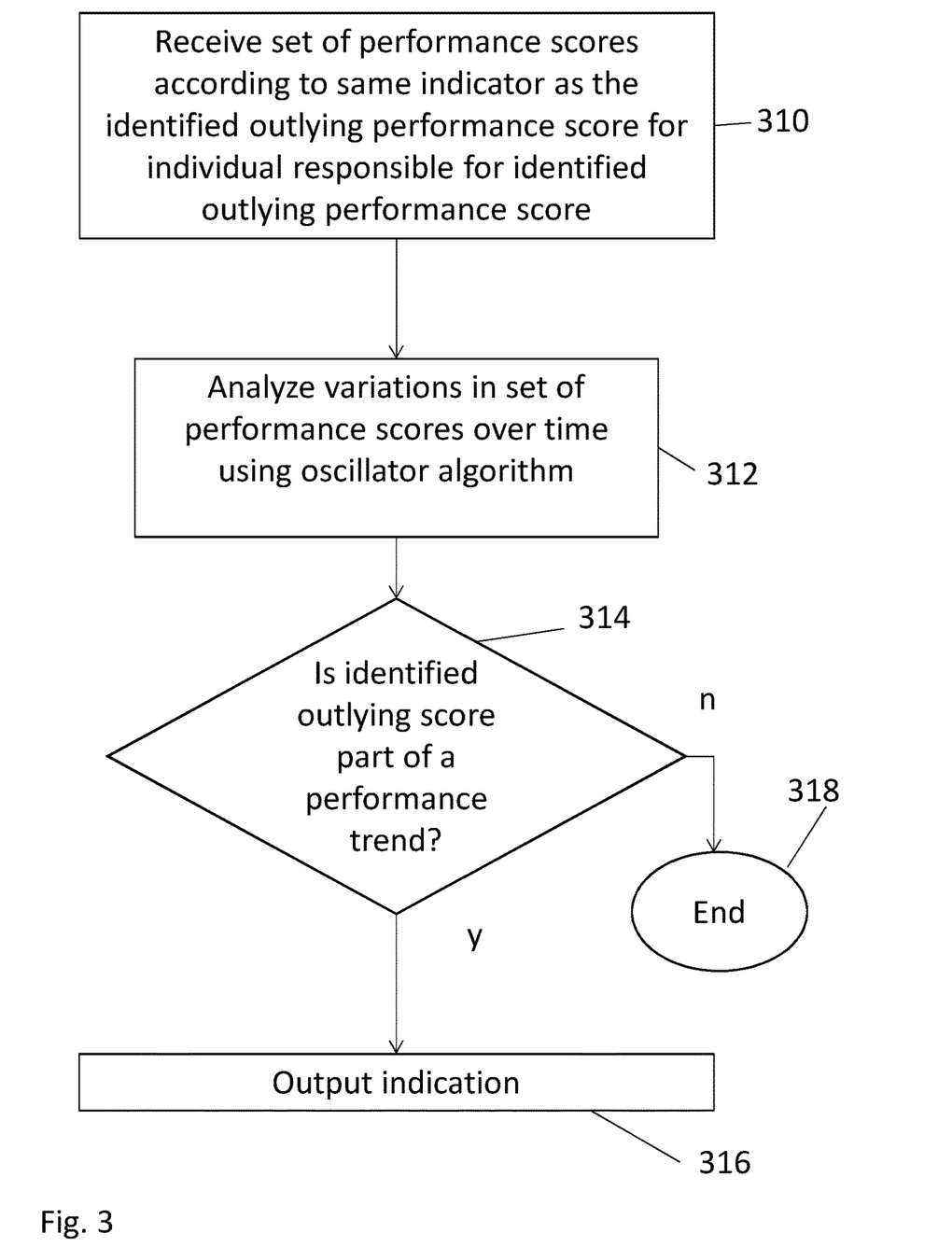
FIG. 3 is a flow chart showing determination whether a selected performance score is indicative of a downward trend according to some embodiments of the invention.

FIG. 3 shows a series of operations that may be carried out in order to determine whether a selected performance score of an individual is indicative of a downward trend in performance according to some embodiments of the invention.

The flow of FIG. 3 begins at operation 310 with receiving performance scores for a selected individual whose performance score is determined to be trending (e.g. associated with the score or responsible for the score), for example at operation 123 of FIG. 1. These scores may be scores in a particular area, for example identified in FIG. 1, in which the agent's performance may be trending. For example the performance scores analyzed in the flow of FIG. 1 to identify an outlier may be handling time, in which case the performance scores received at operation 310 may also be handling times. In other words, according to some embodiments of the invention, the performance scores received at operation 310 are scores which have been determined according to the same performance indicator as the performance score identified to be an outlier at operation 119. The set of performance scores may be for example a set of scores over a predetermined time. The variations in score over time are then analyzed using an oscillator algorithm at operation 312. The operations 310 and 312 of FIG. 3 may be for example part of operation 123 of FIG. 1. Decision 314 in FIG. 3 corresponds to decision 125 in FIG. 1, now based on the result of operation 312, where it is determined whether the variations in performance score of the individual indicate a trend in performance, in other words whether a trend has been identified. If the result is positive, then in response to this identification of a trend an indication to this effect may be output at operation 316, following which the flow may continue to operation 127 of FIG. 1. If the result is negative no further action may be taken and the process may end at operation 318. The indication output at operation 316 may include an indication of the cause of the trend. Thus for example the indication may take place after the investigation, used in some embodiments of the invention, at operation 127 of FIG. 1.

As noted in connection with FIG. 2, a trend identification may be output if it is identified at operation 312 that the oscillator reaches an extreme value. The thresholds used for determining whether a score is an outlier may be determined as a result of experimentation with real data.

According to some embodiments of the invention, the flows of one or both of FIG. 1 and FIG. 3 may be limited to performance scores for tasks which may be described by particular variables, rather than all tasks. This may be appropriate for example if some kinds of performance score are not appropriate to all tasks. Thus for example operation 310 in FIG. 3 may include receiving a set of performance scores for an individual relating only to tasks having a particular variable, for example tasks of a particular type.

Cause Evaluation

Figure 4:
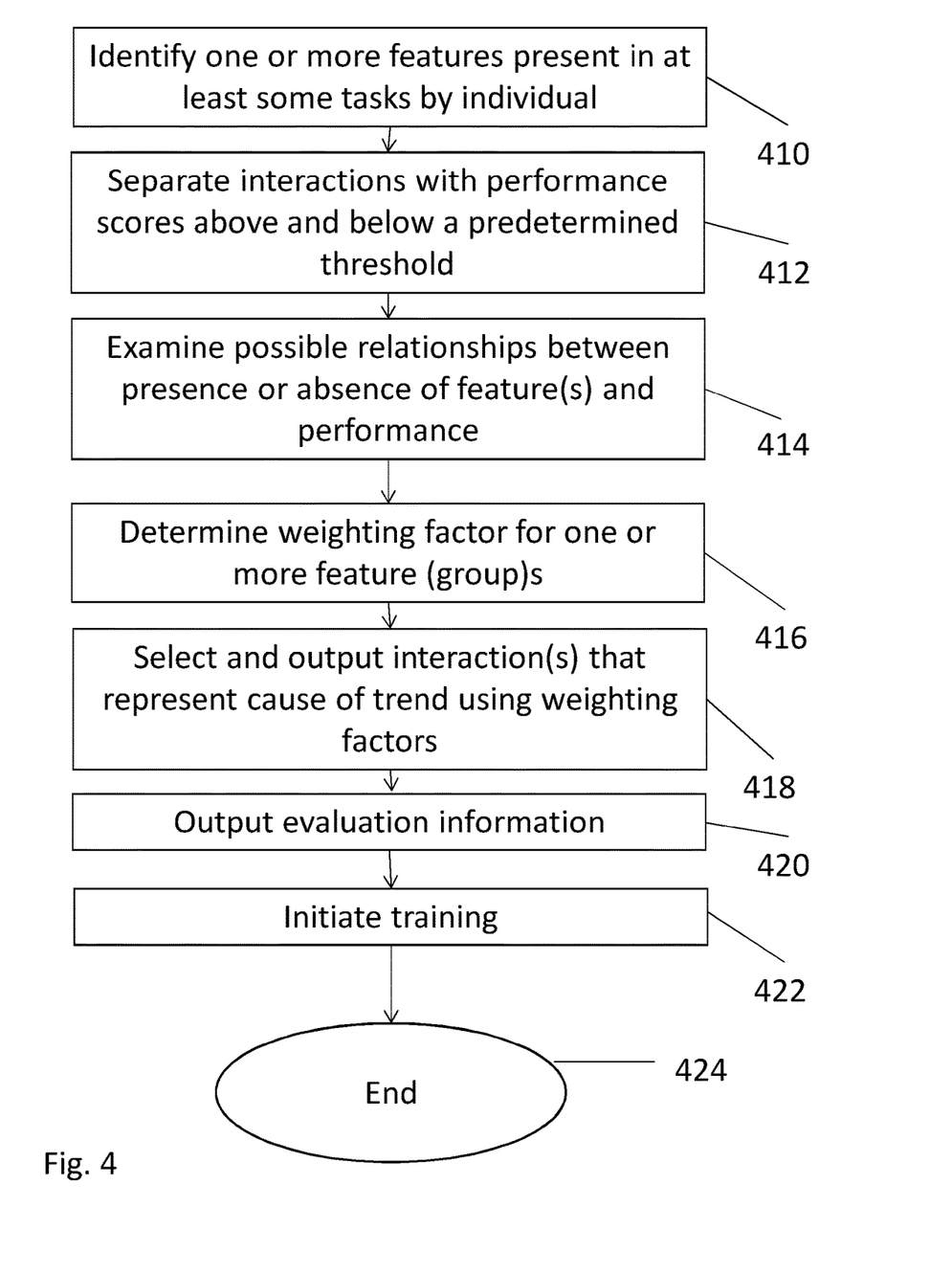
FIG. 4 is a flow chart showing a series of steps which may take place to investigate possible causes of a performance trend according to some embodiments of the invention.

A series of steps which may take place in operation 127 according to some embodiments of the invention is illustrated in FIG. 4. The flow of FIG. 4 begins at operation 410 with the identification of one or more features present in at least some tasks performed by an individual, for example the set of tasks corresponding to the set of performance scores received in operation 310. The tasks may be particular kinds of task, e.g. characterized by one or more variables. At operation 412 interactions may be separated according to whether the corresponding performance scores, for example as received at operation 310, are above or below a predetermined threshold. At operation 414 possible relationships between performance and the presence or absence of a feature or group of features in a task may be examined. This may be done for example using supervised machine learning, known to those skilled in the art, examples of which are described with reference to FIG. 6. For example, in the case where the tasks consist of call handling by agents, possible features identified may include a sentiment uttered, silence (e.g. more than a predetermined duration), cross-talk, phrases uttered and others such as may be known to those skilled in the art of call handling analysis. A machine learning model may then be used to determine which features or groups of features are most connected to or indicative of the difference between poor calls and good calls for an agent.

At operation 416 a weighting factor for one or more features or groups of features may be determined for the feature or group of features and the performance scores. The feature or group of features with the highest score, or the highest few from the possible features or feature groups, may be selected as being the underlying cause of a performance trend. For example it may be found that silence has the largest effect on call handling time and therefore more weight may be given to silence as a possible cause of low handling time. It should be noted here that a call center may for example have insight into what was said in a call, how it was said and what was happening on the screen at the time. Other features of a call that may be related to a performance indicator and which may indicate a training requirement include but are not limited to agent interruptions, cross talk, poor sentiment, agent talking too much relative to customer, certain phrases said or omitted, agent reviewing the knowledge base (sign of lack of knowledge), playing games or using social media for personal reasons (indicator of a will not skill issue), and poor navigation of screens. Other examples of features that may be found to be related to performance such as CSAT may include age, working hours, location, a set of features that determines handling time, education and gender. Many more will be apparent to those skilled in the art.

At operation 418 the weighting factors may be used to select an interaction or interactions that best represents the cause of the trend the selected interaction(s) or some identification of the interactions, and such interaction(s) may also be output at operation 418. In the case of a downward trend such interaction(s) may for example be used as an example in training the individual whose performance is declining. In the case of an upward trend this may for example be used in the training of other individuals, e.g. those new to the task or having declining performance.

At operation 420 additional evaluation information may be output, for example in the form of a list. In the case of a call center agent this information might include:
Determination of Agent Problematic Area (e.g. KPI and Variable(s))
Cause for Trend
Estimated size of the problem (for example in the case of a downward trend).

At operation 422 training may be initiated, for example according to the evaluation information output at operation 420. This initiation may take various forms such as but not limited to sending a link to the individual to online training appropriate to the cause of the trend in performance, sending training materials such as presentations and other documents to an individual by any known messaging service, or "pushing" the individual to undertake training, for example by disabling some of the ability of the individual to perform a task until certain training has been performed. The training may be selected, for example from a database, based on the outcome of the investigation of the cause of the trend in performance score. For example if the performance score is handling time and the cause is found to be long silences, training might be provided to enable an agent to act on to callers' responses to questions more quickly and thereby reduce handling time. Other examples of training that might be initiated in response to trending of a particular performance indicator include but are not limited to improving the knowledge of an individual, for example to be better able to respond to inquiries, training on more efficient use of software, behaviour training such as how to be more patient and empathizing with callers, and speech training for example to improve clarity and audibility. The flow of FIG. 4 ends at operation 424.

System Architecture

Figure 5:
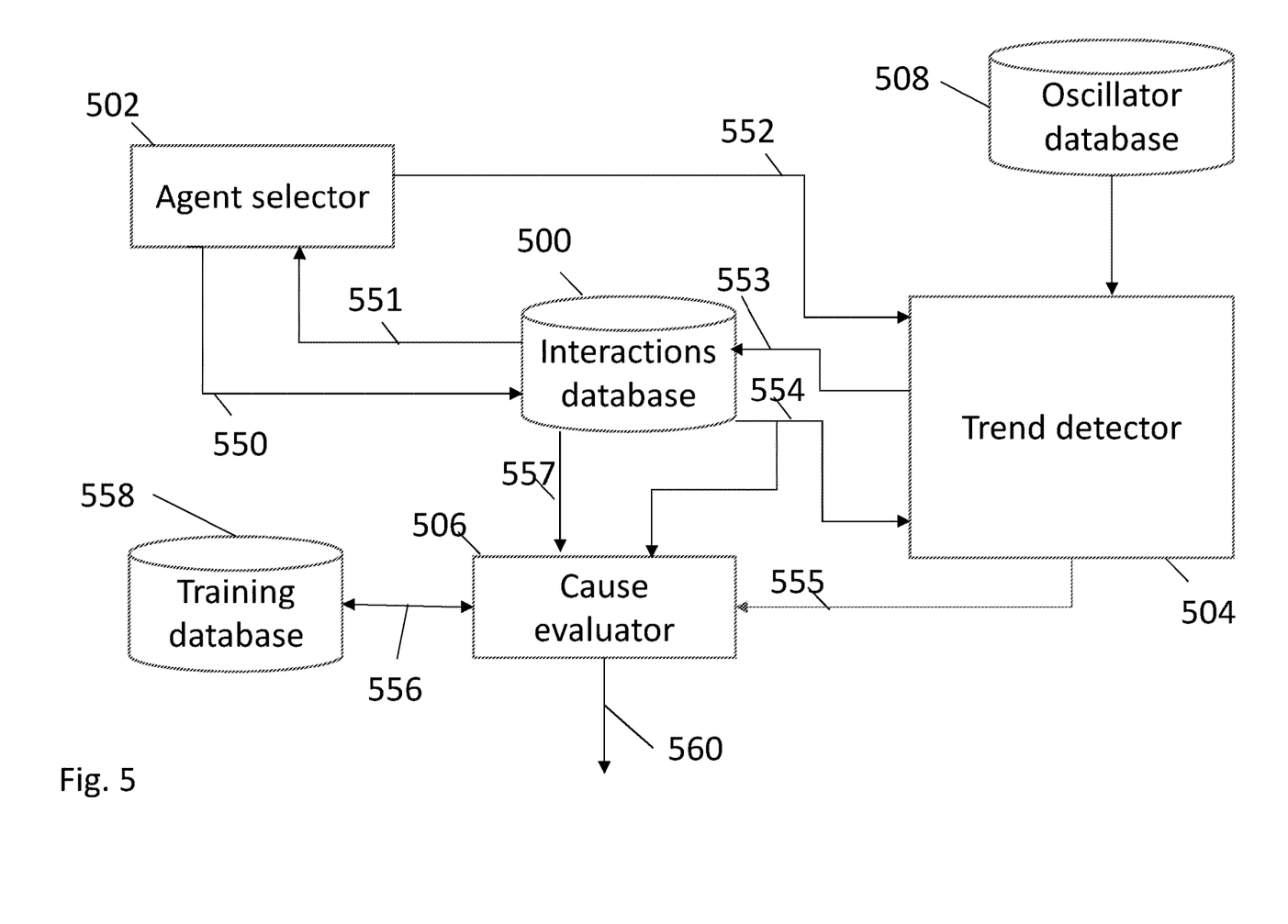
FIG. 5 shows a possible architecture for a system according to some embodiments of the invention.

FIG. 5 shows a possible architecture for a system according to some embodiments of the invention. This is described as it may be used in evaluating the performance of agents whose tasks are to handle interactions in a call center. It will be appreciated that the same or a similar architecture may be used for monitoring the performance of individuals in other environments executing other tasks. The architecture of FIG. 5 may be implemented in a computing system such as the system described with reference to FIG. 7.

The architecture of FIG. 5 includes a database 500 containing details of executed tasks. In the example of FIG. 5 this is an interactions database 500. This may include details of interactions conducted by agents including but not limited to:
Agent Identity
Duration of Interaction
Performance scores according to one or more KPIs.
The details may be stored in various ways, for example there may be a record for each interaction which may be retrieved using an interaction identity. Information may be supplied to the interactions database from a call center in any way well known in the art and is not discussed further herein.

The architecture of FIG. 5 further includes several modules including an agent selector 502, trend detector 504 and cause evaluator 506 and further includes oscillator database 508 and training database 558. The agent selector 502 may be configured to implement operations 111-119 of FIG. 1. The trend detection module may be configured to implement the operations of FIG. 3 using an oscillator program from the oscillator database 508. The cause evaluator 506 may be configured to implement the operations of FIG. 4. Each module may for example include a computer processor or a section of a computer processor operating according to an algorithm. The modules may be implemented on the same or different computers or may be distributed across multiple computers. For example, one processor may execute all modules discussed herein.

Agent selector 502 may request information from the interactions database 500, as indicated by arrow 550, in order to select one or more agents whose performance is to be evaluated. This information may include performance scores that have already been determined, or it may include details of interactions from which performance scores may be determined by the agent selector 502. Requested information is returned to the agent selection module from the interactions database as indicated by arrow 551. Agent selector 502 may then perform a series of operations, such as operations 111-119 to select individuals whose performance is to be further examined Agent selection module may output an indication to the trend detector 504 to enable the trend detector to identify the individual whose performance it is to examine. Thus, the output of agent selection module 502 indicated by arrow 550 may for example be the identity of an agent and type of task or the identity of the interaction which generated the performance score selected at operation 119.

On receipt of output 552 from agent selector 502, the trend detector 504 may implement the operations of FIG. 3, commencing for example with requesting performance scores for an agent identified by the agent selector 502 as indicated by arrow 553 from the interactions database 500. The performance scores may be returned as indicated by arrow 554 following which the trend detector 504 may implement the operations of FIG. 3 to output an indication that the performance of the agent is trending denoted by arrow 555 to cause evaluator 506.

Cause evaluator 506 may implement the operations of FIG. 4 to output evaluation information as indicated by arrow 556. Cause evaluator 506 may use machine learning, and therefore, according to some embodiments of the invention, interaction data relating to agents that were not selected by agent selector 502 may be provided to the cause evaluator 506 for the purpose of learning relationships between features and/or variables and performance. This is indicated by arrow 557. A system according to some embodiments of the invention may additionally comprise a training database 558. This may for example contain training materials in various forms known in the art. Thus according to some embodiments of the invention, the evaluation information may be output to the training materials database 558 in the form of a request for a selection of appropriate training material or a link to such material which may be activated by an individual. Information supplied by the database 558 may then be output from the cause evaluator 506 as indicated by arrow 560, for example together with the evaluation information.

Data Structure

The input and output information that may be exchanged between the components of FIG. 4 will now be discussed in more detail.

The performance indicators or KPIs that may be investigated for trending may be any of the KPIs currently determined in call center management and interaction analysis. A business client of a call center may require multiple KPIs to be measured but the statistical behavior of a single KPI, may have a significant influence on the success of, for example, a product for which customer service is being offered through a call center or a service being provided by the call center. Known KPIs include time, revenue and customer satisfaction (CSAT) discussed further herein. Embodiments of the invention are not limited in terms of performance indicator.

The length of calls is a leading indicator when measuring the performances of an agent. When monitoring call duration, or time, as a KPI, at least the following values may be of interest and may be part of a time KPI data structure:

Agent ID
Start Time
Ending Time
Contact Reasoning

The Agent ID may be used to relate a call to an agent. Regarding the time stamps themselves, start time and end time, it may be useful to learn relationships between performances and lengths of calls or relationship between performances and specific hours during the day, for example daytime and nighttime, or both. Thus it may be useful to specify the actual hours and not only the durations. The contact reasoning (CR) value may be useful to filter performance measurements according to different CRs.

An agent can be assessed according to the money or other income that he provides to the organization directly or indirectly, termed revenue. A supervisor may wish to assess the overall revenue that the agent provides or learn in a more refined way.

Since it may be useful to calculate either the total revenue or the revenue which was obtained from specific sources the data structure for revenue may include:

Agent ID
Contact Reasoning (e.g. a New Subscriber, Reason for Churn)
Amount of money in a transaction.

"Churn" is a term used in connection with customer loyalty and general refers to the movement of customers, for example between brands or service providers.

CSAT may be measured in various ways, for example by callers being questioned, for example via SMS or a similar medium as to their level of satisfaction. A data structure for CSAT may include:

Agent ID
Contact Reasoning (e.g. a New Subscriber, Reason for Churn)
CSAT.

Other performance indicators that may be monitored include but are not limited to transfers, holds and others. Each of these may be or have a data structure that includes contact reason and agent ID and the quantity to be studied, e.g. actual performance score.

According to some embodiments of the invention the trend detector 504 uses an oscillator algorithm to detect a trend in the performance of an individual. The inputs to the oscillator algorithm may be historical performance scores of a certain agent, for example at operation 310 and as indicated by arrow 554, and may also include a variable, e.g. a topic or variable in which the scores have been measured and the oscillator to be used. For example, it may be determined from experience that one kind of oscillator is preferable to another for the performance scores being considered. The score can be given in common KPI units or in probabilities that reflect the agent's relative performances in comparison with his colleagues.

There are several known oscillators that may be used in some embodiments of the invention including but not limited to:

Moving Average
Exponential Moving Average
RSI
Stochastic

Any of these oscillators or other suitable oscillators may be used to assess the performances of an individual. As the performance scores of the individual decline, the oscillator will decay.

Each of these oscillators as used for analysis of e.g. share prices may be endowed with parameters, e.g. thresholds that stimulate it to alert "Buy" or "Sell" as described with reference to FIG. 2. These parameters may vary, e.g. increase. According to some embodiments of the invention, trends in performance, for example over time, may be analyzed in the same way as trends in share prices, and where the algorithm is known to generate a "buy" or "sell" alert this may be taken to be an indication that an individual requires either training (in the event of declining performance) or a reward (in the event of good performance). It should be noted that depending on the performance score it may not necessarily be the case that the larger the score the better the performance, and therefore either of "buy" and "sell" may indicate improving or declining performance Thus for example "buy" and "sell" as indicated in FIG. 2 may be replaced by "train" and "reward" respectively for the purposes of some embodiments of this invention.

According to some embodiments of the invention, agents who statistically may be assumed to need training may be the agents whose scores deviate from a threshold as indicated in FIG. 2 by the largest amount. On initial operation, an indication from the oscillator that a score is trending, for example the upper threshold in FIG. 2 being exceeded, may be considered as an indication that an agent needs help, however the agent may not necessarily be immediately recommended for training but may instead simply be considered as a candidate. For example, training may only be initiated, or performed, if the performance continues to decline or the individual exhibits downwardly trending performance by another performance indicator.

The output of trend detector 504 may simply be a Boolean variable, for example:

Yes—The agent needs training (e.g. the oscillators indicated declining performance), or No—The agent is a "good enough employee" and no action is required in relation to this specific topic or variable.

The output may also include the agent ID.

Agents for whom NO is output may be tested according to other variables or topics such as other kinds of task they may have been executing. They may be flagged as good agents for future learning. Agents for whom YES is output may continue in a training track.

Machine Learning

Some embodiments of the invention may use machine learning, for example in cause evaluator 506, to attempt to determine the cause of declining performance by an individual. The following discussion is in relation to interactions in call centers by agents but is equally applicable to the execution of other kinds of task by other kinds of individual.

The inputs to the cause evaluator 506 may include events, e.g. interactions, that led to an agent being identified by the trend detector 504, for example as a "training candidate", as indicated by arrow 554. The inputs may further include data such as interaction data originating from one or more other agents, such as another agent which is considered a "good agent" in respect to the topic or variable. Each interaction may be for example an array as known in machine learning with a label of good\bad performance (upon a given KPI and relative performances) and meta data about the interaction itself and the agent who executed it.

Machine learning may be used in any manner known to those skilled in the art to identify significant values in the meta-data relating to interactions, such as features and variables described herein, that distinguish between trending agents, e.g. those with declining performance, and non-trending or only improving agents. The reason for this process is the assumption that declining performance of an agent, for example in a specific topic is caused by or related to something identified by the metadata such as personal feature that determines behavior or obstacles encountered in interactions. This may be regarded as a supervised learning problem that aims to find features that behave differently in agents with declining performance when compared with agents with steady or improving performance.

A feature selection process may take place prior to the commencement of machine learning to identify those features expected to influence performance Initially features may be used that a-priori seem to be relevant. As the system aggregates knowledge a Bayesian inference (BI) may be added to the feature selection in a manner well known in the art.

Figure 6:
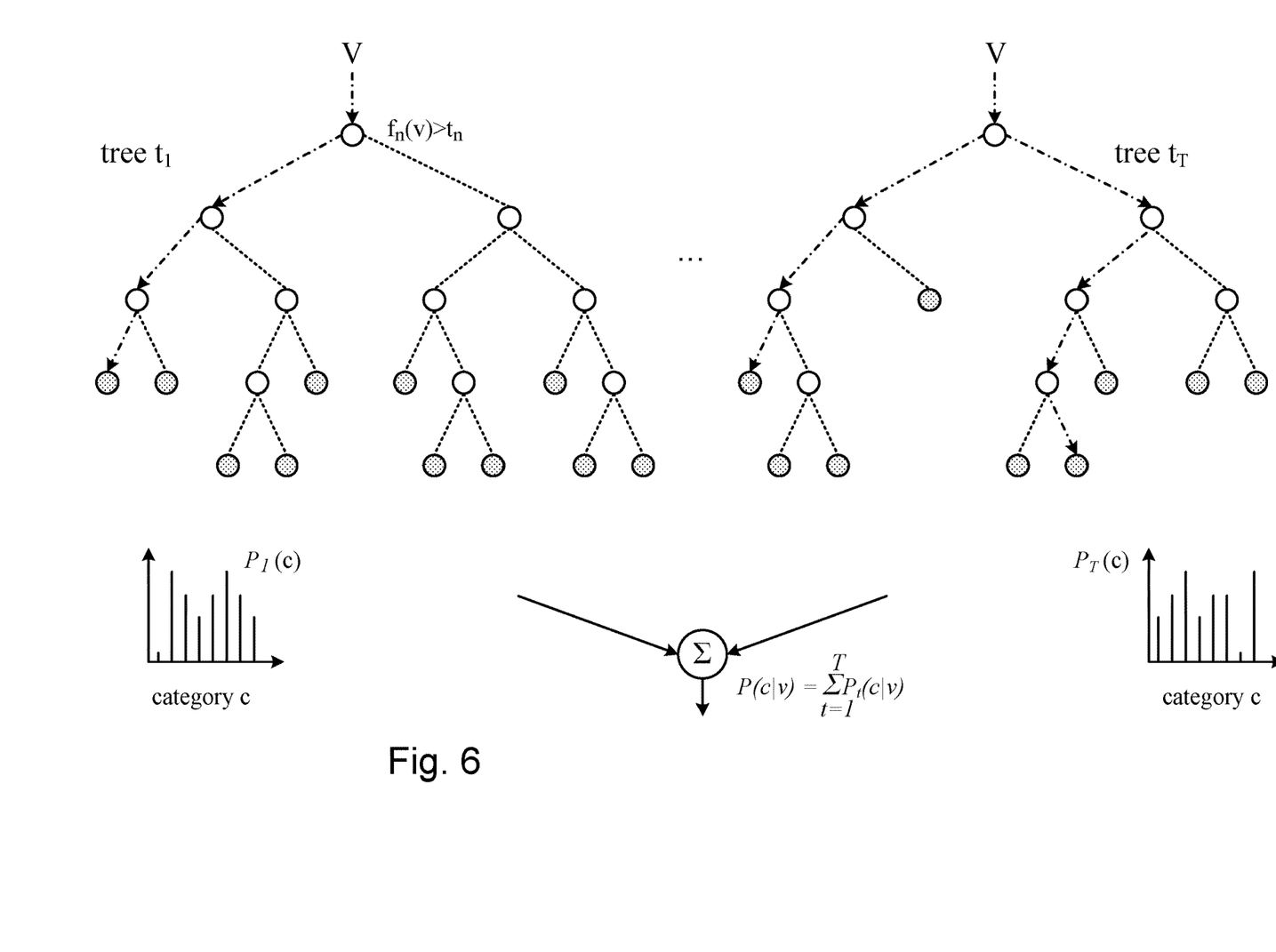
FIG. 6 shows a random forest machine learning tool according to some embodiments of the invention.

One or more of several known machine learning tools may be used in some embodiments of the invention. One of these is the known Random Forest, an example of which is illustrated in FIG. 6.

The random forest is a collection of decision trees that provide a predictive decision upon a majority vote between the trees. A preliminary process such as binning may be performed on some or all features, such as those that may have a range of values, for example rather using raw values they may be organized into bins, e.g. range bins.

Each decision tree may be constructed upon information gain or impurity function. The relevant features, e.g. those most influential on performance for a particular performance indicator, may be expected to be in the upper parts of the tree since they provide a bigger mutual information in respect to the target function, e.g. distinguishing agents on the basis of performance In normal use of a random forest, the output of each tree may be a combination of a decision (e.g. target performance value) and a score. According to some embodiments of the invention, the random forest is used to identify the variables that seem to be dominant in a specific tree and in the entire forest, rather than the target value and the score. Examples of variables may include any of those discussed herein such as but not limited to manners of the agent, the time that the interaction took place and other information that is preserved and help to describe the agent's working environment. The reason is that embodiments of the invention may search for areas of improvement by the agent rather than the quantity of his poor performances. This is a less common use of random forest.

Some embodiments of the invention may additionally or alternatively use a Bayesian model. Here it may be assumed that the attributes, for example variables as discussed herein, are conditionally independent, or the values of the variables are conditionally dependent. A distribution may be developed that predicts the target value, e.g. performance measure, upon features adding a prior distribution based either on BI knowledge or a uniform distribution. As is known in the art, a Bayesian model provides a distribution that aims to predict a target value upon attributes. For developing such a distribution, it is possible to use a prior distribution based on either BI knowledge or any other generic distribution A Bayesian model has the advantage that it may be used during the feature selection process. Here as in the random forest the focus may be the attributes that provide low entropy distribution rather than particular scores. Regarding the method itself we can see in the equation below:

Posterior α Prior×Likelihood $P(\Theta|\text{Data}) = [P(\Theta)P(\text{Data}|\Theta)]/[P(\text{Data})]$ A distribution of the parameters, such as performance measures may be assumed in terms of one or more of the following: uniform, length of the interval, Gaussian, the mean and standard deviation and a mutual distribution may be constructed into a single function.

Some embodiments of the invention may additionally or alternatively use other machine learning tools including but not limited to logistic regression where the leading score or leading outcome may be extracted by magnitude coefficients, and neural networks.

The output of the cause analyzer may take the form of for example a ranked list of attributes, e.g. features or variables, that mimic the level of significance in the model, for example attributes that the machine learning model identified as key players in causing the low performance for the agent whose performance data is being analyzed. The notion significance is related to the power of a given variable in predicting the target (e.g. poorly performing agent). For example it might be expected that a pre education of an agent is more significant in predicting his skills in answering technical questions than the third letter of his surname.

Figure 7:
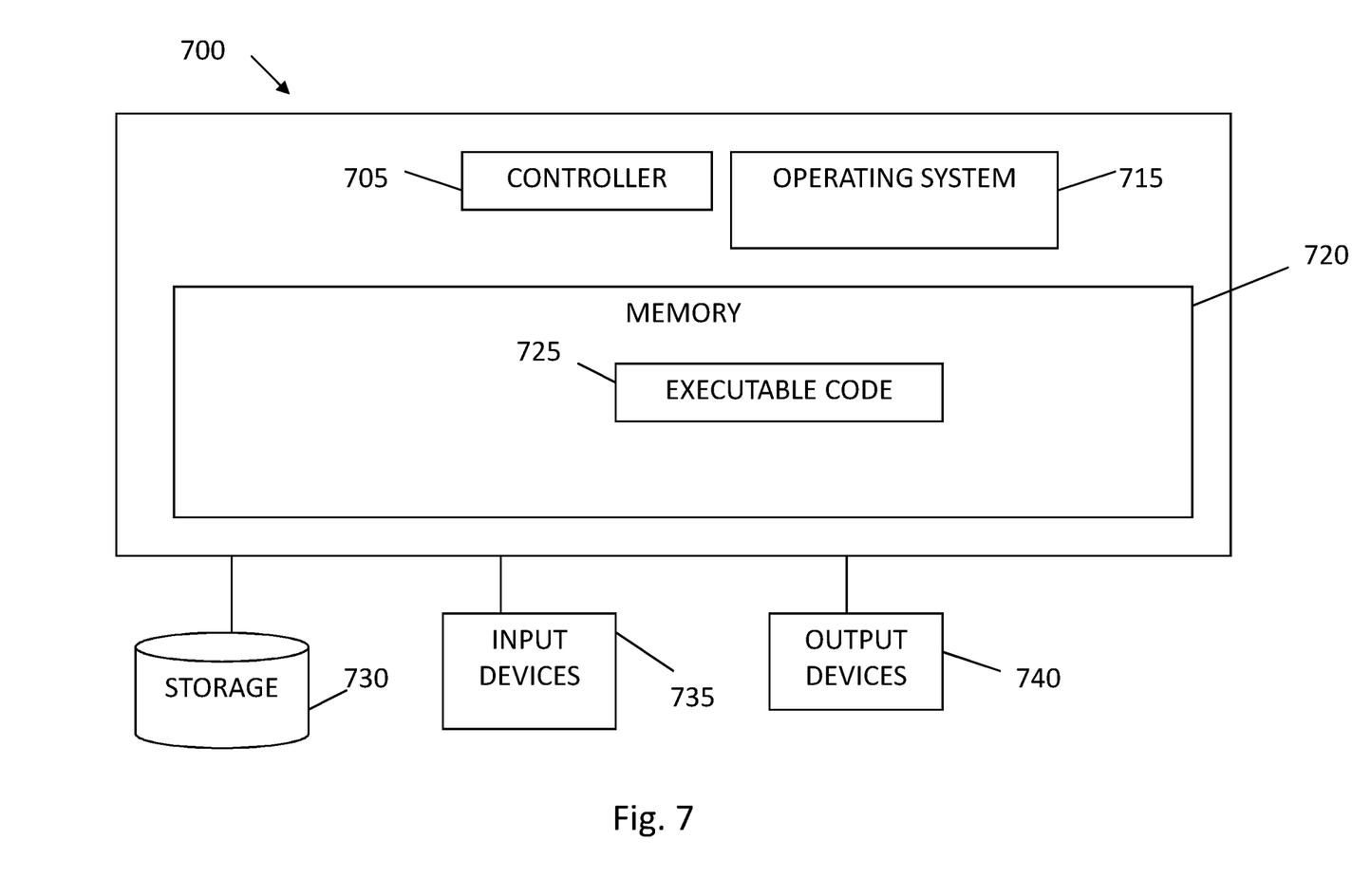
FIG. 7 shows a block diagram of an exemplary computing device according to embodiments of the present invention.

Various components in the system architecture of FIG. 5 such as agent selector 502, trend detector 504 and cause evaluator 506 may be or include components such as shown in FIG. 7, and may be configured to carry out the operations described with reference to FIGS. 1, 3, 4 and 5 by for example executing (or having a processor execute) code or software, and/or by including dedicated code.

Reference is made to FIG. 7, showing a block diagram of an exemplary computing device according to embodiments of the present invention. Computing device 700 may include a controller 705 that may be, for example, a central processing unit processor (CPU), a chip or any suitable computing or computational device, an operating system 715, a memory 720, a storage 730, input devices 735 and output devices 740. Controller 705 may be or include one or more controllers, processors, etc., co-located or distributed.

Operating system 715 may be or may include any code segment designed and/or configured to perform tasks involving coordination, scheduling, arbitration, supervising, controlling or otherwise managing operation of computing device 700, for example, scheduling execution of programs such as agent selection, trend detection and cause evaluation. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units. Memory 720 may include one or more of oscillator database 508, training database 558 and interactions database 500.

Executable code 725 may be any executable code, e.g., an application, a program, a process, task or script. Executable code 725 may be executed by controller 705 possibly under control of operating system 715. For example, executable code 725 may be include an agent selection application, a trend detection application and a cause evaluation application. Where applicable, executable code 725 may carry out operations described herein in real-time. Computing device 700 and executable code 725 may be configured to update, process and/or act upon information at the same rate the information, or a relevant event, are received. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 7 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device.

It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 720, computer-executable instructions such as executable code 725 and a controller such as controller 705.

The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

A specific example of a method according to some embodiments of the invention to evaluate the performance of an agent in a call center may comprise the following steps:

Interaction Assessment
  a. An administrator may decide on, and input to a system, variables (categories, metadata etc.) relevant for a set of KPIs to be investigated
  b. For each interaction all selected variables are identified
  c. For each KPI a distribution is created based on KPI scores for all interactions with theses identified variables
  d. T-score is calculated based on the distribution of the interactions relative to a single interaction being investigated
  e. If T-score is below a threshold for a single interaction, then its trend is sent for investigation Trend Assessment f. All scores for this particular KPI, for the agent responsible for the single interaction, with these variables are investigated g. System tests to see the probability that the trend for this investigation is indeed negative h. If so—cause for this trend is investigated Cause Assessment i. Calls for this particular KPI, for this agent, with these variables are divided into two groups—interactions with KPI score above and below threshold j. Supervised machine learning (ML) is utilized to compare these two groups using "in-call" features (sentiment, silence, cross-talk, phrases uttered etc.)

k. ML model will then determine which of these features are most connected to the difference between the agent's poor calls and good calls e.g. with good and bad being determined according to performance indicator l. The system will select those features with the highest weights as the underlying cause m. The model will be used again to score the interactions with the features selected so as to select the interaction that will best represent the cause of the issue identified Result n. Evaluator will receive the following information
 i. Determination of agent problematic area (KPI/Variable(s))
 ii. Cause for this agent's decline in performance
 iii. Interactions that best represent the issue with the cause
 iv. Estimated size of the problem.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of performance analysis comprising:
using a computer processor executing an agent selector module to identify an outlying performance score for the performance of a task by an individual in a group of individuals by comparing single performance scores with a distribution of performance scores across all individuals in the group, the performance scores being stored in an interactions database;
executing by the computer processor a trend detection module determining whether said identified outlying performance score is part of a trend in performance using an oscillator algorithm input from an oscillator database, the oscillator algorithm measuring variations in performance scores over time; and
if it is determined that the identified outlying performance score is part of a trend then:
outputting an indication of the trend; and
if the trend is a downward trend, executing by the computer processor a cause evaluator module identifying one or more features which are present in at least some executions of the task by executing a decision tree machine learning process, the cause evaluator module taking input data describing the group of individuals and outputting a cause for the trend.

2. The method of claim 1 comprising:
investigating relationships between the performance scores for the individual responsible for the identified outlying performance score with the presence or absence of a value for said one or more features.

3. The method of claim 2 comprising outputting an indication that the performance of the individual is on a downward trend and an indication of the cause based on said investigating.

4. The method of claim 2 comprising initiating training for the individual responsible for the single performance score.

5. The method of claim 2 comprising selecting training based on the outcome of said investigating.

6. The method of claim 2 wherein said investigating comprises separating interactions with performance scores above and below a predetermined threshold and examining possible relationships between the presence or absence of one or more features in a task and performance of the individual.

7. The method of claim 6 comprising determining a weighting factor for at least some of the one or more features according to strength of influence on performance.

8. The method of claim 7 comprising using one or more said weighting factors to select a representative interaction that represents the cause of the trend in performance.

9. The method of claim 1 wherein said trend is a downward trend.

10. The method of claim 1 wherein the comparison includes calculating the T-score for each single performance score.

11. The method of claim 1 wherein the tasks comprise conducting interactions in a call center.

12. The method of claim 1 comprising identifying one or more variables which distinguish some tasks from others, wherein the performance scores and the distribution of performance scores are determined only for tasks having a particular variable.

13. A performance monitoring system comprising:
a database containing details of executed tasks; and
one or more computer processors configured to implement:
a selector to select one or more individuals whose performance is to be evaluated by identifying an outlying performance score for the performance of a task by an individual in a group of individuals by comparing single performance scores with a distribution of performance scores across all individuals in the group, the performance scores being stored in the database;
a trend detector to detect trends in the performance of selected individuals by determining whether said identified outlying performance score is part of a trend in performance using an oscillator algorithm input from an oscillator database, the oscillator algorithm measuring variations in performance scores over time; and
if it is determined that said identified outlying performance score is part of a trend then:
outputting an indication of the trend; and
if the trend is a downward trend, executing a cause evaluator module identifying one or more features which are present in at least some executions of the task by executing a decision tree machine learning process, the cause evaluator module taking input data describing the group of individuals and outputting a cause for the trend.

14. The system of claim 13 wherein performance is monitored according to one or more performance indicators and configured to select said oscillator from the oscillator database depending on performance indicator.

15. A method of performance monitoring comprising:
   obtaining a performance score for each execution of a task by individuals in a group of individuals;
   selecting individuals for evaluation by using a computer processor executing an agent selector module to identify an outlying performance score for the performance of a task by the individuals in the group of individuals by comparing at least one of their performance scores with a distribution of performance scores across the group of individuals, the performance scores being stored in an interactions database; and
   for selected individuals, using an oscillator algorithm executed by the computer processor to determine whether said selected performance score is part of a trend in performance, the oscillator algorithm being input from an oscillator database, the oscillator algorithm measuring variations in performance scores over time; and
   if it is determined that the identified outlying performance score is part of a trend then:
      outputting an indication of the trend; and
      if the trend is a downward trend, executing by the computer processor a cause evaluator module identifying one or more features which are present in at least some executions of the task by executing a decision tree machine learning process, the cause evaluator module taking input data describing the group of individuals and outputting a cause for the trend.

16. A method according to claim 15 wherein when a determination is made that said selected performance score indicates a downward trend in performance:
   investigating relationships between the performance scores for the individual with the presence or absence of a value for one or more features present in tasks corresponding to the performance scores.

17. A method according to claim 16 comprising initiating training for the individual responsible for the performance scores according to the outcome of the investigation.

* * * * *